(12) United States Patent
Nip

(10) Patent No.: US 7,635,729 B2
(45) Date of Patent: Dec. 22, 2009

(54) ZINC OXIDE COATED PARTICLES, COMPOSITIONS CONTAINING THE SAME, AND METHODS FOR MAKING THE SAME

(76) Inventor: Raymond Lee Nip, 21-835 Bangna Villa, Bangna Trad Road KM 2, Bangkok 10260 (TH)

(*) Notice: Subject to any disclaimer, the term of this patent is extended or adjusted under 35 U.S.C. 154(b) by 24 days.

(21) Appl. No.: 11/519,949

(22) Filed: Sep. 11, 2006

(65) Prior Publication Data

US 2007/0072959 A1    Mar. 29, 2007

Related U.S. Application Data

(60) Provisional application No. 60/722,501, filed on Sep. 29, 2005.

(51) Int. Cl.
| | |
|---|---|
| C08K 7/18 | (2006.01) |
| C08K 7/26 | (2006.01) |
| C08K 9/00 | (2006.01) |
| C08K 9/04 | (2006.01) |
| C08K 9/10 | (2006.01) |

(52) U.S. Cl. .................. 523/205; 523/210; 524/425; 524/432; 524/445; 524/449; 524/451; 524/492; 428/403; 428/702

(58) Field of Classification Search ............. 523/205, 523/210; 428/403, 702; 524/445, 449, 451, 524/432, 425, 492
See application file for complete search history.

(56) References Cited

U.S. PATENT DOCUMENTS

| | | | |
|---|---|---|---|
| 4,071,357 A | 1/1978 | Peters | |
| 4,207,377 A | 6/1980 | Kindrick | |
| 4,331,706 A | 5/1982 | Kindrick | |
| 4,373,041 A | 2/1983 | Wood et al. | |
| 4,810,578 A | 3/1989 | Prescott et al. | |
| 4,889,881 A | 12/1989 | Takao et al. | |
| 5,741,471 A | 4/1998 | Deutsch et al. | |
| 5,750,086 A | 5/1998 | You | |
| 5,840,795 A | 11/1998 | Freeman et al. | |
| 5,968,531 A | 10/1999 | Miyoshi et al. | |
| 6,013,699 A | 1/2000 | Freeman et al. | |
| 6,147,151 A | 11/2000 | Fukumoto et al. | |
| 6,159,613 A | 12/2000 | Reilly et al. | |
| 6,184,283 B1 | 2/2001 | Komatsuki et al. | |
| 6,221,146 B1 | 4/2001 | Fortier et al. | |
| 6,242,092 B1 | 6/2001 | Katsuyama et al. | |
| 6,294,143 B1 | 9/2001 | Deutsch et al. | |
| 6,337,362 B1 | 1/2002 | Reynolds et al. | |
| 6,342,552 B1 | 1/2002 | Hergenrother et al. | |
| 6,447,759 B2 | 9/2002 | Noguchi et al. | |
| 6,514,414 B1 | 2/2003 | Martin | |
| 6,825,262 B2 | 11/2004 | Görl et al. | |
| 2004/0030028 A1 | 2/2004 | Resendes et al. | |
| 2004/0071956 A1 | 4/2004 | Tsuji et al. | |
| 2004/0249045 A1 | 12/2004 | Goodman et al. | |

FOREIGN PATENT DOCUMENTS

JP    2002-212461    7/2002

OTHER PUBLICATIONS

PCT International Search Report dated Feb. 22, 2007; International Application No. PCT/US 06/37229; Zinc Oxide Coated Particles, Compositions Containing the Same, and Methods for Making the Same; 2 Pages.
Written Opinion of the International Searching Authority dated Feb. 22, 2007; International Application No. PCT/US 06/37229; Zinc Oxide Coated Particles, Compositions Containing the Same, and Methods for Making the Same; 6 Pages.
Masatoshi Chikasawa, Masatada Fuji, Takashi Takei, Naoaki Shimura, Yoshihisa Sugiyama, Nanami Marutsuka, Katsuyiki Tanabe, & Kohei Mitsuhashi; Production Method for Zinc-Carrying Inorganic Powder; Patent Abstracts of Japan; Publ. Date: Jul. 31, 2002; Publ. No. JP 2001/0336919; 2 Pgs.; Japan Patent Office.
Raymond L. Nip; Zinc Oxide Coated Particles, Compositions Containing the Same, and Methods for Making the Same; International Application No. PCT/US2006/037229; International Preliminary Report on Patentability dated Sep. 24, 2008; 10 pages; International Preliminary Examining Authority/US.

*Primary Examiner*—Kriellion A Sanders
(74) *Attorney, Agent, or Firm*—The Law Offices of Andrew D. Fortney; Andrew D. Fortney

(57) ABSTRACT

Zinc oxide and/or zinc carbonate coated particles, methods of coating particles with zinc oxide and/or zinc carbonate, and various applications of such coated particles, including applications in cosmetics, rubber, and other polymer materials, are disclosed. As compared to rubber formulations with zinc oxide and core materials added separately, formulations including the present coated particles may have a higher transparency, lower Mooney viscosity and lower minimum torque, improved dispersability, a higher modulus at 100% and/or at 300% elongation, a higher tensile strength, better aging resistance, better abrasion resistance, lower density, and/or lower heat build up. Thus, products containing the present coated particles may enjoy similar or better properties than comparative products that include a conventional filler and/or zinc oxide per se, and the present coated particles may result in cost savings for the corresponding product formulations.

42 Claims, 2 Drawing Sheets

ZINC OXIDE COATED PARTICLES, COMPOSITIONS CONTAINING THE SAME, AND METHODS FOR MAKING THE SAME

RELATED APPLICATIONS

This application claims the benefit of U.S. Provisional Application No. 60/722,501 filed Sep. 29, 2005, incorporated herein by reference in its entirety.

FIELD OF THE INVENTION

The present invention generally relates to the field of zinc oxide coated particles, methods of coating particles with zinc oxide, and various applications of such zinc oxide coated particles, including applications in cosmetics, rubber, other polymer materials, and the like in which the coated particles function, e.g., as one or more of a rheology modifying agent, a filler, a UV blocking agent, a filler for rubber or plastics (especially in tires), and/or a rubber activator.

DISCUSSION OF THE BACKGROUND

Zinc oxide is widely used in rubber, UV resistant plastics, cosmetic formulations (including lotions, ointments, creams, antiseptics, etc.), paint, sensors, LED's, transistors and other microelectronic devices, medical devices, etc. Zinc oxide is used in these applications for a wide range of purposes, including as an activating agent, as a UV blocking agent, to reduce the effects of sebum in cosmetic applications, as a pigment, a piezoelectric, an antiseptic agent, for sunscreen protection, as a semiconductor, a transparent conducting oxide, a pryoclectric or dielectric agent, and the like. By itself, zinc oxide is generally not used as a filler due to its expense. For rubber compounding, zinc oxide is used as an activator to initiate the rubber accelerators to begin the vulcanization process. However, most of the zinc oxide is not consumed at vulcanization. Only a small amount at the surface of the zinc oxide is consumed. The remainder of the zinc oxide is, in practical effect, wasted.

New applications of zinc oxide in recent years tend to emphasize small particle size. However, small particle size zinc oxide may be difficult to produce, difficult to-de-agglomerate, and difficult to disperse. The smaller zinc oxide particles can also unduly impair rheology characteristics of a formulation. Fine zinc oxide particles also tend to impair the spreadability and usability of cosmetics and the like.

Accordingly, coating a thin layer of zinc oxide on other, small particle size pigments is proposed as an alternative to using zinc oxide per se. Zinc oxide coated silica, clay, talc, and mica has been suggested to reduce consumption of zinc oxide in rubber compounding. It has also been suggested to coat mica with zinc oxide in order to improve its spreadability.

Zinc oxide also has been used in combination with calcium carbonate to help with the dispersion of zinc oxide in rubber compounding. Attempts include physically mixing zinc oxide with calcium carbonate, and then using the mixture in rubber compounding. This approach appears suitable for only limited situations and/or with marginal effects.

A variety of coated calcium carbonates and sulfates are commercially available. These have included zinc carbonate coated calcium carbonate, zinc oxide coated calcium carbonate, zinc carbonate coated calcium sulfate, and zinc oxide coated calcium sulfate. These generally have been prepared using ground, not precipitated, calcium materials. Analysis of such products suggests that the zinc material is coated on relatively large, rather low surface area calcium carbonate or calcium sulfate. The bulk density of these also appears to be relatively large, e.g., on the order of about 0.6 to 1.1 g/ml. The zinc oxide content of these coated calcium carbonates or sulfates also is believed to range from about 30 to about 55% on a weight basis.

Japanese Patent Application No. JP 2001/0336919, published on Jul. 31, 2002, suggests a method of coating calcium carbonate with a zinc salt of a lower fatty acid or of a mineral acid. The mixture is then thermally baked to decompose a layer of zinc oxide on the surface of the calcium carbonate. Baking of organic materials may release carbon black, which is undesirable for usually white or yellowish zinc oxide. Baking of a mineral salt also may release toxic or highly corrosive materials like sulfur dioxide, hydrogen chloride, etc.

In U.S. Pat. Nos. 4,810,578, 5,840,795, 6,013,699, and 6,147,151, clay, especially clay that is surface-modified with silane coupling agents, is increasingly being used in tires and other rubber compounds. The silanes and clay are used with the intent to increase the modulus and reduce heat build-up of the rubber compound, so that the rolling resistance of the tires decreases, and fuel savings are realized. However, clays alone tend to reduce abrasion resistance in tire formulations as mentioned in U.S. Published Patent Application No. 2004/0249045 by Goodman et al. (Dec. 9, 2004), the relevant portions of which are incorporated herein by reference.

Some rubber compounds, such as those used in shoe soles, rubber bands, etc, need to be transparent or translucent. Unfortunately, ordinary zinc oxide by itself impairs transparency and/or translucency. For example, French process zinc oxide will render a cured rubber compound white and non-transparent at concentrations even as low as 1.5 phr (parts per hundred parts of rubber). Zinc carbonate may be used instead of zinc oxide in rubber compounding at somewhat higher concentrations. However, at 5 phr, good commercial zinc carbonate still does not render the rubber compound totally non-transparent.

SUMMARY OF THE INVENTION

Embodiments of the present invention relate to composite particles in which zinc oxide is formed on substrate particles and/or zinc oxide is co-precipitated as a coating or intermixed with other particles. The particles have many applications in rubber products such as shoe soles, rubber bands, tires, and the like; other polymer products; cosmetics (lotions, ointments, creams, antiseptics), paint, sensors, LED's, transistors and other microelectronic devices, medical devices, etc., and the like. The particles may function as one or more of a rheology modifying agent, a filler, a UV blocking agent, a reinforcing agent (especially in tires), a pigment, a piezoelectric agent, an antiseptic agent, as sunscreen protection, a semiconductor, a transparent conducting oxide, a pryoelectric or dielectric agent, and/or an activator for vulcanization or other reaction.

As compared to otherwise identical rubber formulations including zinc oxide per se or (inorganic) substrate particles per se, formulations including composite particles of the invention may have one or more of the following properties: a higher modulus at 100% and/or at 300% elongation, a higher tensile strength, better aging resistance, better abrasion resistance, lower density, and/or lower heat build up.

In some embodiments, the zinc content of the composite particles is atypically low, which facilitates multipurpose functionality, e.g., the ability to function as both an activator and a filler in rubber vulcanization, for instance. Some embodiments, such as those incorporating a platy clay, talc, and mica or silica, incorporate or include silanol functionality. (Note that the silanol functionality is present on particles such as clay, silica and talc as supplied, but the silanol groups may or may not still be present once incorporated into the composite particles.). Along with small particle sizes and/or a high aspect ratio, it is believed that the chemically active surface silanols on the substrate particles incorporated into the composite particles help to make the resultant composite particles of the invention an excellent filler. The dispersion of zinc oxide in rubber is also improved, and the step of adding ingredients into the rubber compound is thus simplified. In one mode of practice, for instance, zinc oxide coated particles (e.g., platy minerals) may be added in one step as activator, filler, and processing aid.

The present invention also offers the opportunity to make products, e.g., rubber products, with improved abrasion resistance. For example, clays (especially surface modified clay with silane coupling agents) are increasingly being used in tires and other rubber compounds. Although the silanes and clays will greatly increase the modulus and reduce heat build up of the rubber compound so that rolling resistance of tires is decreased and fuel savings are realized, one problem with silane is that the abrasion resistance of the rubber composition is often reduced. In contrast, the zinc oxide coating on a substrate particle, especially an inorganic or platy particle such as a clay, should provide at least part of the performance of the silane coupling agent for the rubber compound without similar impairment of abrasion resistance. Indeed, the zinc oxide coated clay often increases the abrasion resistance compared with clay and zinc oxide added separately. With or without silane coupling agent, zinc oxide coated clay increases modulus at 100% and/or 300% elongation and reduces heat-build up in rubber compounds. This indicates that rolling resistance of tires will be decreased. The zinc-coated particle can thus be used as a partial carbon black or silica substitute. Thus, one particle can serve multiple functions, simplifying formulation and processing.

In cosmetics, because platy particles such platy clay, talc or mica have much better spreadability and usability characteristics than zinc oxide per se, composite particles of the invention that incorporate platy substrate particles are beneficially used in cosmetics. These provide the ability to incorporate zinc oxide into such formulations while maintaining good spreadability and usability characteristics. Thus, the invention may concern a cosmetic composition, comprising (a) a cosmetic lotion, ointment, cream, or antiseptic formulation; and (b) the present composite particles in a cosmetically effective amount, the composite particles containing (1) a particle core selected from the group consisting of clay, talc, and mica, and (2) a coating thereon containing ZnO in an amount of from 1 to about 71% by weight. In general, the cosmetic composition may contain from about 1% to about 90% by weight of the composite particles. Solid-phase cosmetics, such as lipsticks, powders, etc., may contain from 50 to 90 wt. % of the present particles. Cosmetic formulations in the form of a gel, lotion, cream, etc., may contain from 10 to 40 wt. % of the present particles, and from 40 to 90 wt. % of a liquid-phase carrier or expedient, such as water, ethanol, diethylene glycol, etc.

For precipitated silica-filled rubber goods like shoes or tires, replacing some of the silica with zinc oxide coated platy particles of the present invention helps to reduce Mooney viscosity and minimum torque of the rubber mix, thus facilitating easier processing without undue changes in pertinent properties of the cured rubber articles.

Finely sized zinc oxide containing composite particles in which the zinc oxide content is up to 70 weight percent, preferably up to 65 weight percent, of the particles may also be incorporated into rubber products that are intended to be transparent and/or translucent. In these instances, the particles may be used in amounts from about 0.5 to about 5 phr without unduly impacting transparency or translucency, while still offering functionality not only as an activator but also a filler and/or reinforcing agent. These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The invention, in its various aspects, will be explained in greater detail below with regard to exemplary embodiments.

Figure 1:
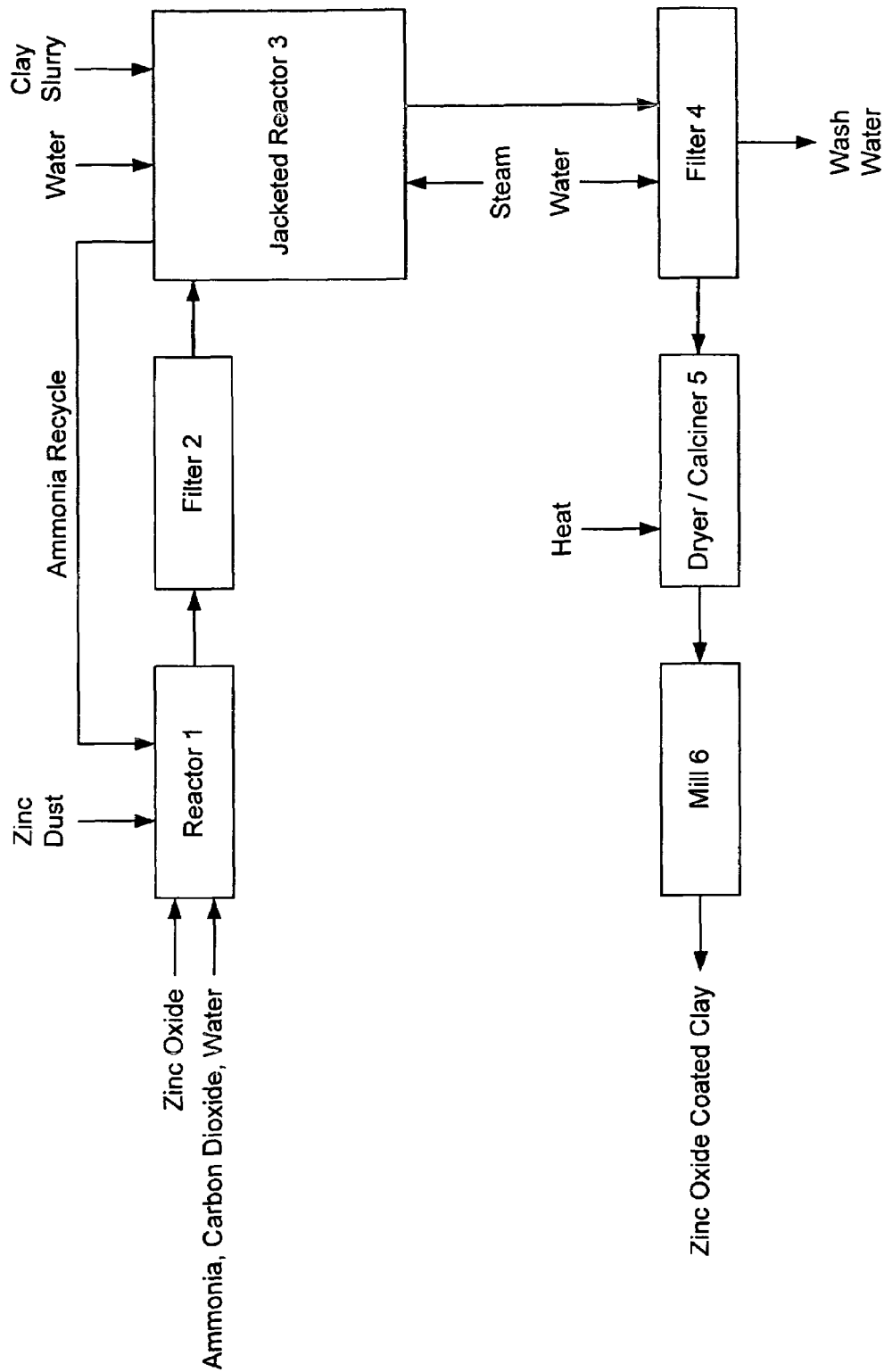
FIG. 1 is a diagram showing an embodiment of a reactor/reaction flow for coating a suspension or slurry of particles with zinc oxide.

One preferred method and apparatus for making composite particles of the invention is illustrated in FIG. 1. In this embodiment, a coating comprising an oxide and/or carbonate of zinc is formed on one or more kinds of inorganic substrate particles such as clay, talc, silica, and the like. The zinc material is precipitated onto the substrate particles from an admixture derived from ingredients comprising an aqueous zinc containing solution and a slurry of the substrate particles. The zinc containing solution is generally basic. Most conveniently, it is obtained by dissolving zinc oxide and/or other zinc bearing materials like zinc ash, roasted zinc sulfide ore, etc., in an aqueous solution comprising an ammonia source (e.g., ammonium hydroxide) and a carbon dioxide source (e.g., carbon dioxide) in reactor 1 to form a zinc ammonia carbonate complex ($Zn[NH_3]_4CO_3$) solution. French process zinc oxide is one example of a zinc oxide. Other zinc sources like zinc ash can also be substituted, but purification of the zinc ammonia carbonate complex solution may then be desirable. Purification can be easily accomplished according to the teachings of U.S. Pat. No. 5,204,084. The weight percent of ammonia in the solution can be from 1% to about 20%. The amount of zinc dissolved in the solution may be (and preferably is) from 1 to 15% by weight. The molar ratio of ammonia to carbon dioxide in the solution preferably is from about 10:1 to 2:1. If low heavy metal and low iron content is desired, the solution optionally can be purified according to the teachings of U.S. Pat. No. 4,207,377 using zinc dust to precipitate heavy metal contaminants. The solution desirably is then filtered through filter 2. A suitable filtering apparatus could be a filter press with stainless steel filter plates, for instance. If further purification is desired, it could be done according to the teachings of U.S. Pat. No. 4,071,357. The zinc ammonia carbonate complex solution desirably is formed at a temperature in the range of from about 20° C. to about 80° C. Any suitable pressure may be used, but atmospheric pressure often is most convenient.

As an alternative, the zinc ammonia carbonate complex solution can optionally be replaced with one or more aqueous solutions of other zinc ammine salts like zinc ammine chloride or zinc ammine sulfate or mixtures of the above, any of which can be formed in situ from the corresponding $ZnX_2$ compound and an ammonia source (e.g., ammonia or ammonium hydroxide).

The preferred zinc ammonia carbonate complex solution flows into jacketed reactor 3. Reactor 3 also is charged with an appropriate amount of an aqueous slurry of the desired substrate particles, which desirably is pre-mixed with heavy agitation. Additional details concerning the concentration and composition of the filtrate from filter 2 at FIG. 1 are mentioned in U.S. Pat. Nos. 5,204,084 and 6,555,075, the relevant portions of which are incorporated herein by reference. One illustrative concentration of the clay slurry is mentioned below at Example 2, but this can vary over a wide range.

A wide range of substrate particles may be used, such as clay, talc, silica, mica, silicon nitride, silicon carbide, activated carbon, carbon black, combinations of these and the like. Platy and/or inorganic particles are most preferred. For instance, suitable clays can be one or more commercial air floated clays with the following compositions (or a composition that is approximately the same, or equivalent thereto):

1) Clay S-40 from Siam Soil Co. Ltd., Bangkok, Thailand

| | |
|---|---|
| $SiO_2$ | 65% |
| $Al_2O_3$ | 17% |
| $Fe_2O_3$ | <1.6% |
| $TiO_2$ | 0.1% |
| MgO | 1.66% |
| CaO | 0.07% |
| Residue on 400 mesh | None |
| Particle size | 30–40% below 2 micron |
| Mean particle size | 3.91 micron |
| BET surface area | 6.16 m²/gr |
| Bulk density | 0.57 |
| pH, 10% slurry | 8.15 |
| Loss on heating at 400° C. | 1% max |

2) Clay C-400 from Siam Soil Co. Ltd, Bangkok, Thailand

| | |
|---|---|
| $SiO_2$ | 65% |
| $Al_2O_3$ | 17% |
| $Fe_2O_3$ | <1.6% |
| $TiO_2$ | 0.1% |
| MgO | 1.66% |
| CaO | 0.07% |
| Residue on 325 mesh | 0.01% max |
| Mean particle size | 11.24 micron |
| BET surface area | 4.62 m2/gr |

-continued

| | |
|---|---|
| Bulk density | 0.70 |
| pH, 10% slurry | 7.95 |
| Loss on heating at 400° C. | 0.49% |

Other examples of substrate particles that are commercially available include the following:

3) Talc from: Liaoning Jiayi Metal & Minerals Co. Ltd Dalian 116001, China

| | |
|---|---|
| Whiteness: | 94% min |
| Loss on ignition: | 7% max |
| Loss on ignition at 400° C.: | 0.21% |
| Loss on ignition at 800° C.: | 2.72% |
| Particle size: | 1250 mesh |
| DMP: | 55% min |
| $SiO_2$: | 60% min |
| MgO: | 30% min |
| $Fe_2O_3$: | 0.3% max |
| DV50 particle size | 9.69 micron |
| BET surface area | 6.27 m²/gr |
| Residue on 325 mesh | 0.1% max |
| Bulk density | 0.34 g/cc |
| pH of 10% slurry | 8.61 |

4) Precipitated silica from United Silica (Siam) Ltd, Rayong 21150, Thailand Ultrasil VN3 PD:

| | |
|---|---|
| BET surface area | 175 m²/gr |
| Loss on drying, 2 hr at 105° C. | 5.0% |
| pH, 5% in water | 6.5 |
| Sieve residue on 63 micron screen | 0.02% |
| Bulk density: | 0.15 g/cc |

Generally, the relative amounts of slurry and solution charges to reactor 3 are selected so that the resultant composite particles preferably include from about 1.6 to about 20 weight percent zinc (generally corresponding to about 2 to 25 weight percent zinc oxide) in many applications. In applications in which the resultant composite particles may be used in transparent or translucent rubber products or polymeric products with silica fillers (or just as a rubber activator), the resultant composite particles may include up to 70 weight percent of zinc oxide (about 56 weight % zinc), typically about 0.5 to 65 wt. %, even more typically 5 to about 65 weight percent zinc oxide (about 4 to about 52 weight % zinc).

The measured amounts of the clay and the zinc ammonia carbonate complex solution are allowed to mix in vessel 3 with good agitation. The reaction may occur with heating and/or by adding an acid. One outcome of heating is that the ammonia is driven off. Another outcome is that zinc-containing material precipitates on the substrate particles. Carbon dioxide will also come out if excess carbon dioxide is in the system. Heat is provided through the steam jacket at the reactor 3. A suitable temperature of the reactor may be from 80° C. to 150° C., and the pressure of the reactor may vary from vacuum to 100 psi. Upon heating of the vessel, ammonia will be liberated from the mixture. At atmospheric pressure, heating the solution to boiling would be suitable. The reaction is desirably deemed to be complete when substantially all ammonia is liberated. At this stage, most or all of the zinc value will also be precipitated. After all or most of the ammonia is driven out and preferably returned to reactor 1, the pH at the reactor 3 will be around 7 to 9, more desirably around 7 to 8. The zinc coating material precipitated is mostly in the form of one or more of basic zinc carbonate, zinc oxide, and/or zinc hydroxide.

Optionally, in place of or in addition to heating, the zinc carbonate/zinc hydroxide/zinc oxide coated substrate particles can also be formed by addition of acid(s) like sulfuric acid, hydrochloric acid, carbon dioxide (carbonic acid), etc., to lower the pH of the slurry to around 7 to 8. In such a case, zinc oxide and/or zinc hydroxide may be replaced with a zinc salt (e.g., of the formula $ZnX_2$, wherein X is a halogen or monoanionic group, or $X_2$ taken together is a dianionic group such as sulfate).

The slurry from the jacketed reactor 3 is then pumped to be filtered at the filter press 4 and washed. The filter cake is then dried and calcined at dryer/calciner 5. The temperature of the dryer/calciner can vary from 110° C. to 800° C. If the initial precipitate is zinc oxide/zinc hydroxide, a drying temperature of 110° C. to 300° C. is good enough to produce a zinc oxide coated composite particle. If the initial precipitate is mostly zinc carbonate, a drying temperature of over 300° C. is more desirable to decompose the zinc carbonate into zinc oxide. By way of example, the dryer can be a flash dryer or a rotary dryer. After drying, the dried powder is then milled at mill 6 and packed. One suitable milling specification is to mill to 99.9% below 325 mesh. The zinc oxide content of the resultant composite particles is anywhere from 1% to 80% depending on the desired application. By way of example, mill 6 can be a Makron type fine-impact mill. Depending upon how much zinc oxide is incorporated into the composite particles, substantially all or only a portion of the surfaces of substrate particles may be coated with the zinc oxide.

Figure 2:
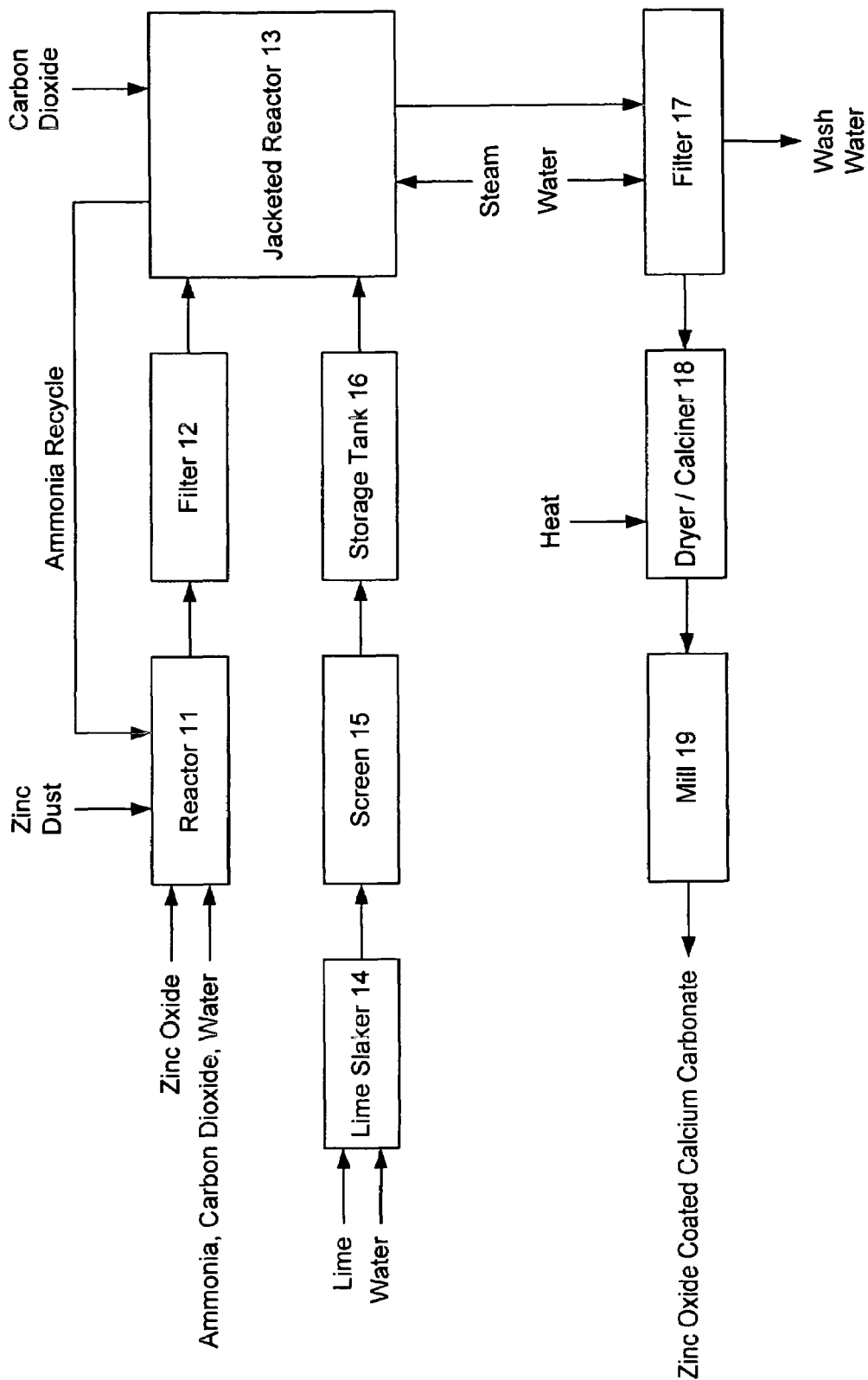
FIG. 2 is a diagram showing an embodiment of a reactor/reaction flow for making calcium carbonate coated (or co-precipitated) with a zinc containing material, such as zinc carbonate or zinc oxide.

FIG. 1 describes an embodiment in which zinc oxide is coated onto pre-existing substrate particles. In another embodiment of the present invention, composite particles containing zinc oxide and one or more other materials may be formed by co-precipitation techniques. For example, a preferred embodiment of one co-precipitation methodology of the present invention is illustrated by the flow sheet depicted in the FIG. 2 in which zinc containing material and calcium carbonate are co-precipitated. As an overview, FIG. 2 shows a methodology that involves co-precipitating the zinc value and calcium carbonate from an admixture of ingredients comprising an aqueous zinc containing solution, e.g., the zinc ammonia carbonate solution as described above, and milky lime under heating. Then the precipitate is carbonated with carbon dioxide until substantially all remaining lime is converted to calcium carbonate and all zinc value is precipitated. The resulting composite material is washed, dried, and calcined to provide a composite product including zinc oxide and calcium carbonate.

Using co-precipitated calcium carbonate or the like is advantageous. Calcium carbonate may be classified as either ground calcium carbonate or as precipitated calcium carbonate. The precipitated calcium carbonate, which may be prepared by reacting lime slurry with carbon dioxide, has larger surface area and smaller particle sizes. Particle size may be important in calcium carbonate, especially for rubber or plastic product manufacture. In the present invention, one can produce precipitated calcium carbonate and coat it with zinc oxide at the same time. The whole operation can be greatly simplified. It is beneficial to coat a small amount of zinc oxide on very fine particle size calcium carbonate and use the product both as a filler and an activator. The composite structure helps with the dispersion of zinc oxide while adding two functionalities into the rubber or plastic mix in one step. Coating zinc oxide on smaller calcium carbonate particles helps increase the surface area of the zinc oxide coated calcium carbonate and helps with its dispersion. In rubber compounding, this means better vulcanization and further savings on the zinc value. Precipitated calcium carbonate also has better reactivity with acids. This means that the composite particle will absorb and neutralize the acid produced by the aging process of rubber articles better. This will help with the aging resistance of rubber products.

In more detail, the zinc containing solution is generally basic. Most conveniently, it is obtained by dissolving zinc oxide and/or other zinc bearing material(s) in an aqueous solution of ammonia and carbon dioxide in reactor 11 to form a zinc ammonia carbonate complex solution. French process zinc oxide is one example of a zinc source. Other zinc sources like roasted zinc sulfide ore or zinc ash can also be substituted, but purification of the zinc ammonia carbonate complex solution will then be desirable. Purification can be easily accomplished (e.g., according to the teachings of U.S. Pat. No. 5,204,084, the relevant portion[s] of which are incorporated herein by reference). The weight percent of ammonia in the solution can be from 1% to about 20%. The amount of zinc dissolved in the solution is from 1 to 15% by weight. The molar ratio of ammonia to carbon dioxide in the solution preferably can be from about 10:1 to 2:1.

After the reaction is complete and the zinc ammonia carbonate complex solution is formed, zinc dust may be added to precipitate heavy metal contaminants. The solution desirably is then filtered through filter 12 (see, e.g., FIG. 2). A suitable filtering apparatus could be a filter press with stainless steel filter plates, for instance. Further purification can be done, if desired (e.g., according to U.S. Pat. No. 4,071,357, the relevant portion[s] of which are incorporated herein by reference). The zinc ammonia carbonate complex solution desirably is formed at a temperature in the range of from about 20° C. to about 80° C. Any suitable pressure may be used, but atmospheric pressure often is most convenient. The zinc ammonia carbonate complex solution flows into jacketed reactor 13.

The zinc ammonia carbonate complex solution can optionally be replaced with other zinc ammine salts, like zinc ammine chloride, zinc ammine sulfate, or a mixture thereof.

Referring back to FIG. 2, Lime is slaked with water at slaker 14 to prepare a milky lime. The strength of the milky lime can be anywhere from 1 to 15% of CaO on a theoretical basis, in accordance with industry practice. In actuality, the slurry includes calcium hydroxide, but it is more common to follow the industry convention. After the lime is slaked with water, the resultant calcium hydroxide slurry is filtered at screen 15 to screen out (e.g., remove) the coarse grits. Generally, the screen 15 may comprise a 200 mesh or 325 mesh screen. The filtered slurry is then sent to storage tank 16.

As almost all of the impurity will tend to remain in the resultant composite product, it is desirable to use lime that is as pure as possible. The commercial quick lime, or calcium oxide, that is used to manufacture precipitated calcium carbonate may be used. High-grade commercial quicklime usually contains about 98% CaO, 0.1% to 2% MgO, and some impurity such as iron, silica, aluminum oxide, etc. If very pure lime is desired for special applications such as cosmetics, calcium hydroxide can be also prepared from pure calcium chloride solution and caustic soda (e.g., aqueous NaOH). The slurry is then washed free of sodium chloride (e.g., with water).

An appropriate amount of the calcium hydroxide slurry, or milky lime, with a (theoretical) CaO concentration anywhere from 1% to 15% by weight, is pumped to the jacketed reactor 13 from storage tank 16 with heavy agitation. The resultant admixture is heated. Heating of the vessel can start immediately or at a later time after some aging, if desired. Heat is provided through the steam jacket at the reactor 13. The temperature of the reactor most suitably can be from 80° C. to 150° C., and the pressure of the reactor can vary from vacuum to 100 psi. At atmospheric pressure, heating the solution to boiling may be desirable.

As a consequence of heating the admixture in vessel 13, ammonia will be liberated from the mixture. Carbon dioxide will also come out (or evolve) if excess carbon dioxide is in the system. The reaction is generally deemed to be complete when substantially all ammonia is liberated. At this stage, most or all of the zinc value (e.g., from the zinc ammonia complex) will also be precipitated.

After evaporation of ammonia and precipitation of zinc are complete, the pH of the reacted slurry can vary from about 7 to 10 or above. This may be due to the original amount of carbon dioxide in the zinc ammonia carbon dioxide complex solution and/or the ratio of this solution to the amount of lime. When the end point pH is higher (e.g., 8 or higher, preferably about 9 or higher), the precipitated zinc can be substantially in the form of zinc oxide or zinc hydroxide. However, if the amount of carbon dioxide is large, most or all of the lime is converted to calcium carbonate during precipitation, and the end point pH will be lower (e.g., 9 or lower, preferably about 8 or lower). If carbon dioxide from the zinc ammonia carbonate complex solution is high enough, some or most of the zinc value may precipitate as zinc carbonate.

After all or most of the ammonia is driven out and preferably returned to reactor 11, reactor 13 is cooled down to 50° C. or below. After cooling, carbon dioxide desirably is pumped into the vessel 13 to carbonate any excess lime (e.g., convert it into calcium carbonate). The precipitate is carbonated with carbon dioxide to a pH of 7 or below at pressure from atmospheric pressure to 30 psi.

The slurry from the jacketed reactor 13 is then pumped to the filter press 17, to be filtered and washed. The filter cake is then dried and calcined at dryer/calciner 18. The temperature of the dryer/calciner 18 can vary from 110° C. to 600° C. If the initial precipitate is zinc oxide/zinc hydroxide, a drying temperature of 110° C. to 300° C. is good enough to produce a zinc oxide coated composite particle. If the initial precipitate is mostly zinc carbonate, a drying temperature of over 300° C. is more desirable to decompose the zinc carbonate into zinc oxide. By way of example, the dryer can be a flash dryer or a rotary dryer.

After drying, the dried powder is then milled at mill 19 and packed. One suitable milling specification is to mill to 99.9% below 325 mesh (e.g., 99.9% of all of the particles have a size below 325 mesh). The zinc oxide content of the resultant composite particles is anywhere from 1% to 80%, depending on the desired application, the concentration of zinc in the zinc ammonia complex solution, the concentration of calcium oxide in the milky lime, and/or the ratio of the zinc ammonia complex solution to calcium oxide/calcium hydroxide in the milky lime. By way of example, mill 6 can be a Makron type fine-impact mill. Depending upon how much zinc oxide is incorporated into the composite particles, substantially all or only a portion of the surfaces of substrate particles may be coated with the zinc oxide.

The relevant portions of all U.S. patent documents cited herein are incorporated herein by reference for all purposes.

The following examples further illustrate the invention.

EXAMPLE 1

Preparation of Zinc Ammonia Carbonate Complex Solution

Add 1,400 grams of French process zinc oxide into 10.5 kg of ammonium carbonate solution with 10.74% ammonia and 6.18% carbon dioxide. Agitate until all zinc oxide is dissolved. Add 40 grams of zinc dust with heavy agitation for 30 minutes then filter the resulting slurry. The filtrate is 11.1 kg of zinc ammonia carbonate complex solution with 9.78% Zinc, 9.48% ammonia, and 5.45% carbon dioxide. This is called solution A. The solution contains less than 1 ppm of heavy metal as lead and less than 2 ppm of iron.

EXAMPLE 2

Coating of Clay

For rubber or rubber latex products like tires, shoe soles, rubber bands, latex gloves, etc., the amount of zinc oxide activator added is usually about 1 to 5 phr. Fillers like carbon black, calcium carbonates, china clay, silica, talc, etc., are used to reduce cost and/or to modify properties. The total amount of the fillers is usually much higher than the amount of zinc oxide. It is around 5 to 10 phr for latex elastic thread and up to 80 phr for tires. Thus, the rubber composition may further include one or more optional additives, such as carbon black, calcium carbonate, a clay, silica, talc, an antioxidant, a retarder, a lubricant (e.g., a paraffin wax), an activator, sulfur, an accelerator, a processing oil (e.g., an aromatic oil), and a processing aid (e.g., a coumarone resin or styrene resin). If the zinc oxide coated clay is to be used as both an activator and a filler, the coating should be relatively thin so that not too much zinc oxide is added to the system.

Zinc oxide is generally difficult to disperse in rubber and usually requires a relatively long mixing time. Coating a filler material with zinc oxide simplifies the addition of both zinc oxide and the filler, and improves the dispersion of zinc oxide in rubber and plastics. To keep the ratio of filler to zinc oxide within the above ratios or ratio ranges, the zinc oxide coating to filler ratio should be low; e.g., from 1% to 25% of zinc oxide by weight.

The following clay, grade S-40, was obtained from Siam Soil Co. Ltd., Bangkok, Thailand. Add 540 grams of clay S-40 into 2,000 grams of water. Stir well and then add 614 grams of zinc ammonia carbonate complex (solution A). Boil and agitate the mixture on an electric stove until there is no smell of ammonia. As a lot of water is evaporated during the 150 minutes of heating, 500 grams of water was added to prevent the slurry from becoming dry. The pH of the slurry becomes 7.50 at the end of the heating. Wash, filter and dry the slurry at 150° C. for 4 hours. Grind the resulting powder and sieve it through a 325-mesh screen. The powder obtained is zinc carbonate coated clay, and it is labeled powder B. Heating 400 grams of powder B at a muffle furnace at 400° C. for two hours yields 384 grams of powder C. The powder C is zinc oxide coated clay. The following table includes data from the analysis of the powder C:

| Material | Heating Temperature | pH of 10% slurry | Wt. % Zinc | Wt. % Clay | Bulk Density | BET surface area (m$^2$/gr) |
|---|---|---|---|---|---|---|
| Powder C | 400° C. | 9.06 | 10.06 | 86 | 0.41 | 13.2 |

EXAMPLE 3

Coating Clay with Different Amounts of Zinc Oxide

Using the same method as Example 2, the following zinc oxide coated clay is prepared with clay S-40:

| Material | Heating Temperature | pH of 10% slurry | Wt. % Zinc | Wt. % Clay | Bulk Density | BET surface area (m$^2$/gr) |
|---|---|---|---|---|---|---|
| Powder D | 400° C. | 8.88 | 7.11 | 90 | 0.45 | 10.4 |
| Powder E | 400° C. | 8.98 | 47.1 | 37 | 0.27 | 35.7 |
| Powder F | 400° C. | 8.64 | 42.6 | 44 | 0.30 | 32.1 |
| Powder G | 400° C. | 7.38 | 25.3 | 67 | 0.30 | 21.8 |

EXAMPLE 4

Coating a Larger Particle Size Clay with Zinc Oxide

Using the same method as Example 2, the following zinc oxide coated clay is prepared with clay C-400:

| Material | Heating Temperature | pH of 10% slurry | Wt. % Zinc | Wt. % Clay | Bulk Density | BET surface area (m$^2$/gr) |
|---|---|---|---|---|---|---|
| Powder H | 400° C. | 7.68 | 48.6 | 38 | 0.53 | 35.3 |

EXAMPLE 5

Coating other Materials with Different Amounts of Zinc Oxide

Talc generally has good visible light transmission, good flow characteristics, low friction, and is widely used in rubber and cosmetic applications. Using talc from Liaoning Jiayi Metal & Minerals Co., Ltd., and the method of Example 2, the following zinc oxide coated talc was prepared:

| Material | Heating Temperature | pH of 10% slurry | Wt. % Zinc | Wt. % Talc | Bulk Density | BET surface area (m$^2$/gr) |
|---|---|---|---|---|---|---|
| Powder J | 400° C. | 9.38 | 47.05 | 38 | 0.25 | 30.5 |
| Powder K | 400° C. | 9.31 | 10.30 | 87 | 0.29 | 13.6 |
| Powder L | 400° C. | 9.38 | 7.33 | 91 | 0.33 | 11.3 |
| Powder M | 400° C. | 9.50 | 42.06 | 45 | 0.21 | 32.7 |
| Powder W | 400° C. | 8.58 | 25.15 | 68 | 0.26 | 23.1 |

Using precipitated silicon dioxide from United Silica (Siam) Ltd. and the method of Example 2, the following zinc oxide coated silica was also prepared:

| Material | Heating Temperature | pH of 10% slurry | Wt. % Zinc | Wt. % Silica | Bulk Density | BET surface area (m$^2$/gr) |
|---|---|---|---|---|---|---|
| Powder N | 400° C. | 8.13 | 10.0 | 87 | 0.10 | 158.3 |

EXAMPLE 6

Preparation of Calcium Hydroxide 2000 grams of commercial quick lime from Saraburi Lime Co., Ltd. (Thailand) is added into 20 kg of water and agitated well until all the lime is slaked. Filter the resulting slurry through a 200-mesh screen to obtain 20 kg of 11.3% calcium hydroxide slurry. This is called lime slurry 6B.

EXAMPLE 7

Preparation of Zinc Oxide Coated Calcium Carbonate

Add 1800 grams of solution A to 1028 grams of lime slurry 6B. Agitate well. The resulting slurry has a pH of 10.2. Boil and agitate the mixture on an electric stove until there is no smell of ammonia. As a lot of water is evaporated during the 120 minutes of heating, 3,500 grams of water is added to prevent the slurry becoming dry. The pH of the slurry becomes 8.38 at the end of the heating. Bubble carbon dioxide for 15 hours at 20 psi of pressure into the slurry, to pH 6.06 and/or until all lime is carbonated. Wash, filter and dry the slurry at 150° C. for 4 hours. Grind the resulting powder and sieve it through a 325-mesh screen. The powder obtained is zinc carbonate coated calcium carbonate and is labeled powder P. Heat 160 grams of powder P in a muffle furnace at 400° C. for two hours to obtain 135 grams of powder. The powder is zinc oxide coated calcium carbonate and is labeled powder Q. The following table includes data from the analysis of the two powders:

| Material | Heating Temperature | pH of 10% slurry | Wt. % Zinc | Wt. % Calcium | Bulk Density | BET surface area (m$^2$/gr) |
|---|---|---|---|---|---|---|
| Powder P | 150° C. | 8.94 | 36.54 | 15.14 | 0.20 | — |
| Powder Q | 400° C. | 9.85 | 43.4 | 18.33 | 0.27 | 49.3 |

Using the same method as Example 2, but varying the amount of zinc ammonia carbonate complex, we obtain the following:

| Material | Heating Temperature | pH of 10% slurry | Wt. % Zinc | Wt. % Calcium | Bulk Density | BET surface area (m$^2$/gr) |
|---|---|---|---|---|---|---|
| Powder R | 400° C. | 9.22 | 7.0 | 35.68 | 0.31 | 44.6 |
| Powder S | 400° C. | 9.60 | 10.1 | 34.78 | 0.34 | 45.7 |

There are a lot of waste zinc materials contaminated with chloride or sulfates in the steel galvanizing industry. This includes, but not limited to, sal skimming, which is recovered from the flux blanket. When ammonia (and optionally, carbon dioxide) is added to the sal skimming slurry to make zinc ammonia carbonate complex solution, the solution turns into mixture of other zinc ammine salts, like zinc ammine chloride [$Zn(NH_3)_2Cl_2$], zinc ammine sulfate, etc. Calcium hydroxide is very suitable to react with such a solution for preparation of the present zinc oxide coated calcium carbonate.

When the lime is being slaked, carbonated, or coated with zinc oxide, other additives or techniques can also be applied to aid its dispersion or modify the particle sizes or shape (e.g., according to methods described in U.S. Pat. Nos. 6,294,143, 5,741,471, and 6,221,146, the relevant portions of which are incorporated herein by reference).

EXAMPLE 8

Zinc Oxide Coated Particles as a Rubber Activator and/or Filler in Tires

The invention is compared with a French process zinc oxide and a clay filler for its ability to activate the rubber vulcanization process and to serve as a filler. The following ingredients were used, and their source of supply is provided:

French process zinc oxide X—made by Univenture Limited, Bangkok, Thailand via the French process. Its zinc oxide content is over 99%.

Basic Zinc Carbonate Y with 71% zinc oxide—a zinc carbonate made by Global Chemical Co. Ltd, Thailand Zinc Oxide NC105 Z—a composite having a grounded calcium carbonate core and about 55% zinc oxide coating, manufactured by Global Chemical Co. Ltd, Thailand Zinc Oxide NC625 Z1—a composite having a ground calcium carbonate core and about 62% zinc oxide coating, manufactured by Global Chemical Co. Ltd, Thailand Natural Rubber, STR-5L—standard Thai natural rubber, Thai Industrial Standard STR-5L Butyl Rubber 0150—Channel Chemical, Bangkok, Thailand Carbon Black N-330—made by Thai Tokai Carbon Product Co. Ltd.

Antioxidant, 6PPD—Flexsys, NV, Belgium

Antioxidant, WSL—Goodyear Tire and Rubber, Akron, Ohio

Coumarone resin and accelerators TBBS, TMTD, MBTS, and MBT were obtained from Lung Soon Huang Co. Ltd., Samut Prakarn, Thailand.

The tire formulation recipe for this test is listed below:

| Material | Dosage, phr |
| --- | --- |
| Natural Rubber, STR-5L | 80 |
| BR 0150 | 20 |
| Stearic Acid | 2 |
| Antioxidant 6PPD | 2 |
| Carbon Black N-330 | 42 |
| Retarder PVI | 0.2 |
| Styrene Resin | 4 |
| Paraffin Wax | 3 |
| Accelerator TBBS | 1 |
| Sulfur | 2.4 |
| Aromatic Oil | 10 |
| Activator/Filler | (variable, as noted below) |
| Clay/silica | (variable, as noted below) |

The samples for mechanical tests are cured at 150° C. for 12 minutes. The rheometer cure time and scorch time are obtained at 150° C.

| | Test No. | | | | |
| --- | --- | --- | --- | --- | --- |
| | T1 | T2 | T3 | T4 | T5 |
| Activator/Filler No. | D | C | S | K | X |
| Amount (phr) | 35 | 35 | 35 | 35 | 5 |
| Clay S-40, phr | | | | | 30 |
| Total phr, all ingredients | 201.6 | 201.6 | 201.6 | 201.6 | 201.6 |
| Hardness (Shore A) | 74 | 74 | 75 | 75 | 73 |
| Modulus at 100%, psi | 499 | 520 | 505 | 564 | 436 |
| Modulus at 300%, psi | 1576 | 1570 | 1586 | 1675 | 1409 |
| Tensile Strength, psi | 2222 | 2233 | 2036 | 2208 | 2021 |
| Elongation at break, % | 418 | 412 | 365 | 382 | 424 |
| Abrasion Loss, $mm^3$ | 80.2 | 78.7 | 79.4 | 77.9 | 86.8 |
| Heat build up, delta H, ° C. | 51.9 | 58.8 | 68.7 | 50.6 | 72.4 |
| Specific gravity | 1.27 | 1.27 | 1.26 | 1.26 | 1.28 |
| Scorch time, min 170° C. | 3:30 | 3:22 | 3:08 | 3:19 | 3:18 |
| Cure time, min 170° C. | 6:01 | 6:00 | 5:59 | 5:40 | 5:35 |
| Min. Torque (Tmin; dNm) | 9.81 | 8.03 | 9.62 | 8.62 | 8.40 |
| Max. Torque (Tmax; dNm) | 83.4 | 75.4 | 76.5 | 74.3 | 71.5 |

The high modulus at 100% and 300%, the lower heat build up, and the better abrasion resistance of the compositions of Test Nos. T1 and T2 compared with Test No. T5 indicate lower rolling resistance, fuel savings, and longer durability for tires. The composition of Test No. T4 shows even lower heat build up and better abrasion resistance than the compositions of Test Nos. T1 and T2. Silanes, which are relatively expensive, are used to treat clay to increase modulus and reduce heat build up of tire formulation. The invention may reduce or eliminate its use. The above data show that the zinc oxide coating of the present invention improves the overall performance of the clay as compared to the physical and/or mechanical combination of clay and zinc oxide at Test No. T5.

EXAMPLE 9

Zinc Oxide Coated Particle as a Transparent Rubber Activator and Reinforcing Filler for Elastic and Shoe Soles For some rubber products like rubber bands, certain shoe soles, etc., where transparency is important. There is also need for transparent UV resistant additives in plastic. Thus, the present invention further concerns a transparent or translucent rubber product, containing a rubber, the present ZnO-coated particles, or one or more (preferably two or more) additives, such as calcium carbonate, a clay, silica, talc, an antioxidant, a retarder, a lubricant, an activator, an accelerator, sulfur, a processing oil, and a processing aid. The invention is compared with zinc carbonate, which is traditionally used for transparent rubber goods as an activator instead of French process zinc oxide. The reason for using zinc carbonate is that French process zinc oxide has higher hinding power and causes the rubber product to become non-transparent. The zinc carbonate for comparison purposes, which is labeled powder Y and which has 57.3% zinc content, is made by Global Chemical Co., Ltd. (Samut Prakarn, Thailand) by the conventional zinc sulfate and soda ash process.

For elastics, whether made with dry rubber or latex, properties such as modulus, elongation at break, and aging are very important. Zinc oxide coated clay or talc gives about the same properties as zinc carbonate, but with slightly better transparency. Zinc oxide coated calcium carbonate gives slightly lower transparency than zinc carbonate.

The following recipe is for a transparent rubber band formulation:

| Material | Dosage, phr |
|---|---|
| Natural Rubber, STR-5L | 100 |
| Stearic Acid | 1 |
| Antioxidant WSL | 1 |
| Accelerator MBTS | 1 |
| Sulfur | 2 |
| TMTD | 0.1 |
| Activators | 1.5 |

The samples for mechanical tests are cured at 140° C. for 15 minutes. However, rubber products according to the invention may be cured (or vulcanized) by heating at a temperature of from 100 to 180° C. for a length of time sufficient cure (or vulcanize) the product. The rheometer cure time and scorch time are obtained at 160° C.

|  | Test No. | | | | |
|---|---|---|---|---|---|
|  | T11 | T12 | T13 | T14 | T15 |
| Activator | Y | E | J | Z1 | H |
| Amount (phr) | 1.5 | 1.5 | 1.5 | 1.5 | 1.5 |
| Total (phr) | 108.1 | 108.1 | 108.1 | 108.1 | 108.1 |
| Hardness, Shore A | 41 | 41.7 | 40.8 | 44.4 | 41.3 |
| Modulus at 300%, psi | 116 | 113 | 120 | 116 | 111 |
| Modulus at 500%, psi | 195 | 189 | 200 | 193 | 188 |
| Tensile, psi | 2192 | 2554 | 2479 | 2205 | 2168 |
| Elongation at break, % | 1128 | 1167 | 1128 | 1120 | 1136 |
| Scorch time, minutes | 2.21 | 3.83 | 3.63 | 3.38 | 3.78 |
| Cure time, minutes | 3.50 | 5.71 | 5.46 | 5.08 | 5.92 |
| Torque, min, dNm | 13.6 | 12.9 | 13.2 | 12.2 | 12.8 |
| Torque, max, dNm | 51.4 | 52.6 | 52.6 | 51.4 | 51.9 |
| % Light Transmission** | 51 | 52 | 55 | 48 | 54 |

**The rubber samples are made into 2.2 mm thick rubber sheets, which are laid over the sensor of a Digicon LX-70 light meter from Sang Chai Meter Company Ltd., Bangkok, Thailand. The sensor is 30 cm from a 2000 lux light source (National SQT915D 021 with a FML13EX-N lamp). The illumination values in lux are measured with and without the rubber sheet covering the sensor, and then the illumination value with the rubber sheet is divided by the value taken without the rubber sheet. The value obtained is the percentage of light transmission. The higher the percentage, the more light was transmitted, and hence the more transparent is the rubber sheet. For example, the sensor of the light meter is 30 cm from the light source and the meter reading is 1899 lux without the rubber sheet. After using the rubber sheet to cover the sensor completely, the reading is 803 lux. The percentage of light transmission is then calculated as (803/1899) = 0.42, or 42% for that rubber sheet.

The reason for transparency may be (but is not limited to) the small particle size of the zinc oxide coated particles, and the fact that clay and talc have higher visible light transmittance than calcium carbonate. The transparency is in the order of zinc oxide coated talc>zinc oxide coated clay with larger particle size>zinc oxide coated clay with smaller particle size>zinc carbonate>zinc oxide coated calcium carbonate, which is the least transparent. The transparency, small particle size, and high BET surface area of the zinc oxide coated platy minerals and calcium carbonate make them especially suitable for UV resistant plastics and/or paints, as described in U.S. Pat. No. 6,337,362 (the relevant portions of which are incorporated herein by reference). In a plastic or paint formulation, the composite/ZnO-coated particles are present in an amount effective to protect the plastic or paint from ultraviolet light. For example, the formulation may contain from about 0.5% to about 20% by weight of the present composite particles.

The mechanical properties of the five samples are about the same, but the coated platy minerals according to the invention have slightly better transparencies than the comparative example containing zinc carbonate or the composition containing the inventive coated calcium carbonate. The larger particle size clay core (T15) gives better transparency than the smaller particle size clay core (T12), while its mechanical properties are slightly lower.

This is in agreement with US Patent Application Publ. No. 2004/0249045. Smaller particle size clay has better reinforcing properties than large particle size clay. If mechanical properties other than transparency are desired, a clay as described in US Patent Application Publ. No. 2004/0249045 may be selected as an inorganic particle core for the present coated particles.

EXAMPLE 10

Zinc Oxide Coated Clay as a Filler/Activator for Elastic

Both rubber bands and rubber threads from latex are elastics which have high elongation at break, modulus, resilience and aging properties. To minimize the cost, it is desirable to use as much filler material as possible. Transparency, elongation at break, and change as a function of aging are limiting factors. Following example show the superiority of the invention for elastic application.

The recipe is the same as Example 9, with the following dosage modification(s) shown in table. Test results/composition properties are also given below:

|  | Test No. | | | | |
|---|---|---|---|---|---|
|  | T21 | T22 | T23 | T24 | T25 |
| Activator/Filler | X | Y | D | R | L |
| Amount (phr) | 3 | 3 | 25 | 25 | 25 |
| Clay S-40 (phr) | 22 | 22 |  |  |  |
| Total phr | 131.6 | 131.6 | 131.6 | 131.6 | 131.6 |
| Hardness, Shore A | 40.0 | 43.1 | 43.0 | 43.3 | 46.6 |
| Modulus at 300%, psi | 153 | 170 | 185 | 159 | 322 |
| Modulus at 500%, psi | 254 | 299 | 351 | 271 | 721 |
| Tensile, psi | 2501 | 2677 | 2812 | 2220 | 2838 |
| Elongation at break, % | 1054 | 980 | 988 | 998 | 854 |
| Torque, min, ML (dN·m) | 13.45 | 14.27 | 12.11 | 12.04 | 13.23 |
| Torque, max, MH (dN·m) | 53.96 | 57.30 | 55.81 | 62.06 | 56.41 |
| Scorch time, $T_2$ (min) | 4.08 | 2.96 | 3.63 | 2.92 | 3.38 |
| Cure time, $T_{90}$ (min) | 6.54 | 4.63 | 5.58 | 4.46 | 5.29 |
| Density | 1.04 | 1.04 | 1.04 | 1.04 | 1.04 |
| Transparency | 5 | 19 | 16 | 10 | 28 |

After aging at 100° C. for 22 hours, the properties and their deviation from the original values (as compared with results from unaged samples) are:

|  | Test No. | | | | |
|---|---|---|---|---|---|
|  | T21 | T22 | T23 | T24 | T25 |
| Hardness | 42.8 | 46.3 | 46.3 | 42.6 | 50.4 |
| Modulus at 300%, psi | 204 | 284 | 217 | 171 | 427 |
| % deviation** | 33 | 67 | 17 | −8 | 32 |
| Modulus at 500%, psi | 364 | 597 | 449 | 311 | 904 |

-continued

| | Test No. | | | | |
|---|---|---|---|---|---|
| | T21 | T22 | T23 | T24 | T25 |
| % deviation** | 43 | 100 | 28 | 15 | 25 |
| Tensile, psi | 2618 | 2562 | 2540 | 2091 | 2663 |
| % deviation** | 4 | −5 | −10 | −6 | −6 |
| Elongation at break, % | 922 | 826 | 882 | 940 | 740 |
| % deviation** | −12 | −16 | −11 | −6 | −13 |

**Lower % deviation from the un-aged sample is preferred.

The zinc oxide coated platy minerals clay and talc give much higher modulus at 300% and 500% elongation than the samples containing French process zinc oxide, the zinc carbonate and the coated calcium carbonate. The high modulus also enables the production of thinner or smaller diameter elastics in order to save raw materials. There is no other filler in the composition besides the platy minerals or calcium carbonate, so the observed improved effects are primarily due to the coated platy/inorganic minerals of the invention. After aging, the coated mineral particles tend to retain their original properties better. Transparency is in the order of coated talc>zinc carbonate>coated clay>coated calcium carbonate>zinc oxide. The reason for the lower transparency of zinc oxide coated clay as compared to zinc carbonate may be due to the fact that zinc carbonate is itself more transparent than clay. The amount of clay in this example is much more than the amount of clay in Examples 9 and 11, so the observed transparency results are somewhat more pronounced.

The much higher modulus of the compositions in Test Nos. T23 and T25 at 300% and 500% elongation compared with the compositions in Test Nos. T21, T22, and T24 may indicate the reaction of zinc ions with silanols at the surface of the platy minerals, which is believed to be beneficial to the curing system.

Depending on the types of clay, the amount of zinc oxide coating, the method of coating, etc., the transparency of rubber articles containing zinc oxide coated clay of the present invention is similar to or better than the same rubber articles containing zinc carbonate if the amount of zinc oxide coated clay is below around 5 phr. It is similar or slightly worse if the amount of zinc oxide coated clay is over that amount. However, zinc oxide coated talc tends to give better transparency than zinc carbonate at most, if not all, concentrations.

EXAMPLE 11

Zinc Oxide Coated Clay as a Transparent Activator in a Shoe Sole

Desired properties of many shoe soles include high transparency and high endurance (long lasting). The following is a known/standard recipe for shoe soles, where the components are thoroughly mixed and press cured at 150° C. for 12 min:

| Material | Dosage, phr |
|---|---|
| Natural Rubber, STR-5L | 100 |
| Stearic Acid | 2 |
| BHT | 1 |
| Silica | 60 |
| Rubber oil C | 10 |
| Accelerator MBT | 1 |
| Accelerator MBTS | 0.5 |
| Sulfur | 2 |
| Diethylene Glycol (DEG) | 3 |
| Activators | 4 |

Test results/composition properties are given below:

| | Test No. | | | | | |
|---|---|---|---|---|---|---|
| | T31 | T32 | T33 | T34 | T35 | T36 |
| Activator type | Y | Z | Q | M | F | X |
| Amount (phr) | 4 | 4 | 4 | 4 | 4 | 4 |
| Total phr | 184.2 | 184.2 | 184.2 | 184.2 | 184.2 | 184.2 |
| Hardness, Shore A | 70 | 69 | 69 | 70 | 70 | 71 |
| Modulus at 300% elongation | 824 | 836 | 822 | 876 | 867 | 882 |
| Modulus at 500% elongation | 2180 | 2220 | 2176 | 2300 | 2270 | 2297 |
| Tensile strength, psi | 2893 | 2785 | 2629 | 2757 | 2696 | 2860 |
| Elongation at break, % | 631 | 601 | 588 | 582 | 573 | 599 |
| Torque, min, dNm | 35.6 | 24.0 | 22.9 | 22.0 | 22.9 | 25.6 |
| Torque, max, dNm | 91.6 | 89.3 | 96.1 | 88.7 | 90.5 | 89.5 |
| Mooney Viscosity (ML 1 + 4) 100° C. | 20.13 | 15.69 | 32.82 | 22.75 | 15.38 | 39.17 |
| Scorch time, Ts at 150° C. | 0:46 | 1:33 | 1:40 | 1:46 | 1:48 | 1:40 |
| Cure time, Tc90 at 150° C. | 2:02 | 2:55 | 2:58 | 2:55 | 2:53 | 2:43 |
| Transparency (%) | 40 | 38 | 37 | 44 | 42 | 12 |
| Abrasion, DIN (loss, mm$^3$) | 62.24 | 55.55 | 52.68 | 62.26 | 63.85 | 68.96 |

The zinc oxide coated platy minerals give better transparency than the zinc carbonate or the zinc oxide coated calcium carbonate sample.

It should be note that the minimum torque of rubber compositions containing the inventive coated particles are lower than that of white seal zinc oxide, while hardness, modulus, and tensile strength are about the same. The scorch time of rubber compositions containing the inventive coated particles is longer than that of zinc carbonate, with a slightly longer cure time. Their Mooney viscosity is also lower than that of rubber compositions containing white seal zinc oxide. All of these data suggest easier processing and better mold flow for the shoe sole containing the inventive coated particles. This result is consistent with U.S. Pat. No. 6,342,552. A lower viscosity is important for molded goods and extruded goods.

As precipitated silica is also used in tires, zinc oxide coated/inorganic platy minerals can also lower the viscosity of a rubber composition before curing and assist processing before and after processing. Such compositions containing rubber, zinc-coated clay, talc and/or mica, and precipitated silica may further comprise one or more additives such as carbon black, calcium carbonate, a clay, silica, talc, an antioxidant, a retarder, a lubricant, an activator, an accelerator, sulfur, a processing oil, and a processing aid.

EXAMPLE 12

Zinc Oxide Coated Clay as an Activator, Filler and/or Processing Aid in Silica Filled Tire Formulations The following is a known/standard recipe for silica filled tire formulations:

| Material | Dosage, phr |
| --- | --- |
| Natural Rubber, STR-5L | 80 |
| BR 0150 | 20 |
| Stearic Acid | 2 |
| Antioxidant 6PPD | 2 |
| Carbon Black N-330 | 42 |
| Retarder PVI | 0.2 |
| Styrene Resin | 4 |
| Paraffin Wax | 3 |
| Accelerator TBBS | 1.5 |
| Sulfur | 2.4 |
| Aromatic Oil | 10 |
| DEG | 2 |
| Activator/Filler | (variable, as noted below) |
| Clay/silica | (variable, as noted below) |

Test results/composition properties are given below:

| | Test No. | | |
| --- | --- | --- | --- |
| | T41 | T42 | T43 |
| Silica, phr | 26 | 20 | 20 |
| Clay S-40 | | | 6 |
| Activator | X | G | X |
| Amount (phr) | 4 | 10 | 4 |
| Total phr, all ingredients | 199.1 | 199.1 | 199.1 |
| Hardness, Shore A | 72.9 | 72.4 | 70.7 |
| Modulus at 100%, psi | 345 | 375 | 378 |
| Modulus at 300%, psi | 1168 | 1270 | 1254 |
| Tensile Strength, psi | 2102 | 2214 | 2242 |
| Elongation at break, % | 535 | 527 | 527 |
| Scorch time, min (170° C.) | 2:45 | 3:01 | 2:50 |
| Cure time, min (170° C.) | 5:18 | 5:28 | 4:57 |
| Torque, min, dNm | 15.9 | 13.4 | 13.0 |
| Torque, max, dNm | 75.1 | 77.1 | 76.3 |
| Mooney Viscosity (ML 1 + 4) 100° C. | 83.13 | 57.07 | 67.94 |

As in Example 11, this data again shows a reduction in viscosity and minimum torque of the silica-filled rubber mix made with zinc oxide coated clay. Reduction of viscosity is especially important for extruded rubber goods, as the extruding pressure can be reduced, and wear and tear of machinery is also reduced. Zinc oxide coated clay is thus used as an activator, a processing aid, and a filler in such a rubber composition. Its overall properties are about the same as French process zinc oxide and clay added separately, or the recipe with silica but without clay.

EXAMPLE 13

Clay and Talc as Fillers in Tires

Clay and talc may be used as fillers in tires to replace part of the carbon black to reduce cost. However, tire properties may somehow decrease. This example shows that zinc oxide coated clay or talc can help eliminate or reverse reductions in desired properties resulting from replacement of carbon black with other materials. The tire formulation recipe for this test is listed below:

| Material | Dosage, phr |
| --- | --- |
| Natural Rubber, STR-5L | 80 |
| BR 0150 | 20 |
| Stearic Acid | 2 |
| Antioxidant 6PPD | 2 |
| Carbon Black N-330 | 62 |
| Retarder PVI | 0.2 |
| Styrene Resin | 4 |
| Paraffin Wax | 3 |
| Accelerator TBBS | 1 |
| Sulfur | 2.4 |
| Aromatic Oil | 10 |
| Activator/Filler | (variable, as noted below) |
| Clay | (variable, as noted below) |

The samples for mechanical tests are cured at 160° C. for 12 minutes. The rheometer cure time and scorch time are obtained at 160° C.

| | Test No. | | | |
| --- | --- | --- | --- | --- |
| | T51 | T52 | T53 | T54 |
| Activator/Filler No. | X | X | G | W |
| Amount (phr) | 4 | 4 | 10 | 10 |
| Clay S-40, phr | | 6 | | |
| Total phr, all ingredients | 190.6 | 196.6 | 196.6 | 196.6 |
| Hardness (Shore A) | 63 | 63 | 64 | 64 |
| Modulus at 100%, psi | 245 | 259 | 302 | 302 |
| Modulus at 300%, psi | 994 | 1022 | 1123 | 1094 |
| Tensile Strength, psi | 2563 | 2577 | 2649 | 2664 |
| Elongation at break, % | 627 | 629 | 589 | 641 |
| Abrasion Loss, mm$^3$ | 40.9 | 45.1 | 38.6 | 49.9 |
| Tear strength (N/mm) | 95.7 | 92.9 | 97.9 | 91.2 |
| Scorch time, min 160° C. | 4.67 | 4.42 | 4.44 | 4.33 |
| Cure time, min 160° C. | 8.44 | 7.83 | 8.17 | 8.17 |
| Torque, min (dNm) | 8.03 | 8.25 | 8.47 | 8.03 |
| Torque, max (dNm) | 70.08 | 71.72 | 73.50 | 72.54 |
| After aging at 100° C. for 22 hours: | | | | |
| Hardness (Shore A) | 66 | 67 | 68 | 68 |
| Modulus at 100%, psi | 325 | 349 | 401 | 422 |
| Modulus at 300%, psi | 1282 | 1318 | 1437 | 1455 |
| Tensile Strength, psi | 2101 | 2010 | 2198 | 2371 |
| Elongation at break, % | 432 | 421 | 413 | 455 |

The overall properties of the composition with coated clay particles (T53) is better than the one without clay filler (T51), which in turn has better properties than the composition of Test T52 with 6 phr clay as filler. There is substantial cost reduction for the samples with coated particles as clay and talc, as such particles are expected to be are relatively inexpensive, compared with carbon black or rubber.

EXAMPLE 14

Preparation of Zinc Oxide/Zinc Carbonate Coated Clay without Heating the Clay/Zinc Ammonia Carbonate Complex Mixture Using the process of Example 2, after adding the zinc ammonia carbonate complex solution A to the clay slurry, instead of boiling the mixture, dilute sulfuric acid is added drop-wise into the reactor. Agitate the slurry well until the pH reaches 7.63 and substantially all the zinc value is precipitated. Wash, filter and dry the slurry at 150° C. to obtain zinc carbonate coated clay, which is ground and sieved to 99.8% passing 325 mesh. Calcine zinc carbonate coated clay further at 400° C. to obtain zinc oxide coated clay T. The following data/results were obtained for this composition:

| Material | Heating Temperature | pH of 10% slurry | Wt. % Zinc | Wt. % Clay | Bulk Density |
|---|---|---|---|---|---|
| Powder T | 400° C. | 9.07 | 10.53 | 86 | 0.49 |

If the zinc ammonia carbonate complex is replaced by one or more zinc ammine salts, the zinc hydroxide formed therefrom may be calcined at a lower temperature. Energy savings can thus be realized.

In the manufacture of precipitated silica, the slurry after the precipitation of silica is often acidic. The zinc ammonia carbonate complex solution can thus be added to the slurry to coat the silica with zinc hydroxide and/or zinc carbonate, while the slurry is being neutralized (in some cases, with the zinc ammonia complex solution). After washing, the precipitated silica is dried or calcined (e.g., at 200° C. to 400° C.) to obtain zinc oxide or zinc carbonate coated silica. This method will provide a simple way of coating precipitated silica with zinc oxide.

Conclusion/Summary

Thus, the invention concerns zinc oxide and/or zinc carbonate coated particles, methods of coating particles with zinc oxide and/or zinc carbonate, and various applications of such coated particles, including applications in cosmetics, rubber, and other polymer materials. As compared to rubber formulations including zinc oxide or other particles, formulations including the present coated particles may have a higher transparency, lower Mooney viscosity and lower minimum torque (in silica filled formulations), improved dispersability, a higher modulus at 100% and/or at 300% elongation, a higher tensile strength, better aging resistance, better abrasion resistance, lower density, and/or lower heat build up. Thus, products containing the present coated particles may enjoy similar or better properties than comparative products that include a conventional filler and/or zinc oxide per se, and the present coated particles may result in cost savings for the corresponding product formulations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A composition, comprising:
    a) a rubber; and
    b) a composite particle comprising (i) a particle core consisting essentially of a member selected from the group consisting of silica, clay, talc, mica, activated carbon, and carbon black, and (ii) a coating thereon, consisting essentially of zinc oxide and/or zinc carbonate in an amount of from 1 to 25 weight percent (measured as ZnO) of the composite particle, in an amount of from 6 to 100 phr of the rubber.

2. The composition of claim 1, wherein the rubber comprises a natural rubber, a synthetic rubber, or a mixture thereof.

3. A rubber product selected from the group consisting of a tire, a shoe sole, a rubber band, a rubber thread, a belt, an automobile part, a roller, and a latex product, comprising the composition of claim 1.

4. A composition, comprising:
    a) a rubber; and
    b) a composite particle comprising (i) a particle core consisting essentially of silica, clay, talc, mica, or a mixture thereof, and (ii) a coating thereon, consisting essentially of zinc oxide and/or zinc carbonate in an amount of from 1 to 25 weight percent (measured as ZnO) of the composite particle in an amount of from 6 to 30 phr of the rubber.

5. A transparent or translucent rubber product selected from the group consisting of a rubber band, a shoe sole, and a rubber thread, comprising the composition of claim 4.

6. A method of making the transparent or translucent rubber product of claim 5, comprising:
    a) mixing from 6 to 100 parts by weight of the composite particles with 100 parts by weight of the rubber to form the composition; and
    b) forming the transparent or translucent rubber product from the composition.

7. The method of claim 6, wherein forming the rubber product comprises curing the composition.

8. A composition, comprising:
    a) a rubber;
    b) a composite particle comprising (i) a particle core consisting essentially of clay, talc, mica, or a mixture thereof, and (ii) a coating thereon, consisting essentially of zinc oxide and/or zinc carbonate in an amount of from 1 to 25 weight percent (measured as ZnO) of the composite particle, in an amount of from 6 to 100 phr of the rubber; and
    c) precipitated silica.

9. The composition of claim 8, wherein the rubber comprises a natural rubber, a synthetic rubber, or a mixture thereof.

10. A rubber product selected from the group consisting of a tire and a shoe sole, comprising the composition of claim 9.

11. A composition, comprising:
    a) a formulation comprising a plastic or a paint; and
    b) a composite particle comprising (i) a particle core consisting essentially of silica, clay, talc, mica, or a mixture thereof, and (ii) a coating thereon, consisting essentially of zinc oxide and/or zinc carbonate in an amount of from 1 to 25 weight percent (measured as ZnO) of the composite particle in an amount effective to protect said plastic or paint from ultraviolet light.

12. A method of making coated particles, comprising:
- a) mixing (1) a slurry containing substrate particles with (2) an amount of a zinc ammonia complex solution sufficient to coat the substrate particles with from 1 to 25 wt. % of ZnO;
- b) heating the mixed slurry and solution to remove substantially all ammonia, or until a pH of the mixed slurry and solution is between 7 and 9, thereby precipitating particles having a coating thereon comprising ZnO, $Zn(OH)_2$ and/or $ZnCO_3$ in an amount of from 1 to 25 wt.% of Zn, measured as ZnO; and
- c) optionally, heating the precipitated particles at a temperature of from 150°C. to 800°C. to convert $ZnCO_3$ and/or $Zn(OH)_2$ to ZnO and form the coated particles.

13. The method of claim 12, wherein the zinc ammonia complex solution comprises a zinc ammonia carbonate complex solution, and the method further comprising preparing the zinc ammonia carbonate complex solution from a zinc source, ammonia or an ammonia derivative, and carbon dioxide or a carbon dioxide derivative.

14. The method of claim 12, wherein said zinc ammonia complex solution contains zinc in a concentration of from 0.5% to about 16% by weight, ammonia in a concentration of from 0.5% to 20% by weight, and carbon dioxide in a concentration of from 0 to 20% by weight.

15. The method of claim 12, wherein said substrate particles are present in said slurry in an amount of from 0.5 to about 20% by weight, and the ratio of zinc to substrate particles is from about 0.01:1 to about 0.26:1.

16. The method of claim 12, wherein said substrate particles are selected from the group consisting of silica, clay, talc, mica, activated carbon, and carbon black.

17. The method of claim 12, wherein the mixed slurry and solution is heated at a temperature of about 80°C. to 150°C. and at pressure of 100 psi or less; and the method further comprises optionally carbonating the precipitated particle slurry with carbon dioxide to a pH of about 7 or less to neutralize any excess ammonia and obtain zinc carbonate coated particles; optionally washing, filtering and drying the precipitated particles; optionally milling the coated particles to a size distribution where 99.8% of the coated particles have a particle size under 325 mesh; and optionally calcining the milled coated particles to obtain zinc oxide coated particles.

18. A silica-filled rubber composition, comprising:
- a) 100 parts by weight of rubber;
- b) a silica filler; and
- c) from 3 to 50 parts by weight of composite particles containing a particle core comprising clay, mica or talc, and a coating thereon containing ZnO, where the composite particles contain from 10 to 70 wt. % of ZnO.

19. The composition of claim 18, comprising from 1 to 80 phr of the silica filler.

20. A rubber product selected from the group consisting of a tire and a shoe sole, comprising the composition of claim 18.

21. A transparent or translucent rubber composition, comprising:
- a) 100 parts by weight of a natural rubber, a synthetic rubber, or a mixture thereof; and
- b) from 1 to 25 parts by weight of composite particles containing (1) a particle core selected from the group consisting of clay, talc, mica and silica, and (2) a coating thereon containing ZnO, where the composite particles contain from 10 to 70 wt. % of ZnO.

22. A rubber product selected from the group consisting of a rubber band, rubber thread, and a shoe sole, comprising the composition of claim 21.

23. A method of making coated particles, comprising:
- a) mixing (1) a slurry containing substrate particles with (2) a zinc ammonia complex solution, zinc ammine chloride solution, or zinc ammine sulfate solution; and
- b) adding an acid thereto in an amount sufficient to precipitate particles having a coating thereon comprising ZnO, $Zn(OH)_2$ and/or $ZnCO_3$.

24. The method of claim 23, wherein said acid comprises sulfuric acid, hydrochloric acid, or carbon dioxide.

25. The method of claim 23, wherein said solution contains zinc in a concentration of from 0.5% to about 16% by weight, ammonia in a concentration of from 0.5% to 20% by weight, and carbon dioxide in a concentration of from 0 to 20% by weight.

26. The method of claim 23, wherein said coated particles contain zinc in an amount of from 1 to about 71% by weight, measured as zinc oxide.

27. The method of claim 23, wherein said substrate particles are present in said slurry in an amount of from 0.5 to about 20% by weight, and the ratio of zinc to substrate particles is from about 0.01:1 to about 1.6:1.

28. The method of claim 23, wherein said substrate particles are selected from the group consisting of silica, clay, talc, mica, activated carbon, and carbon black.

29. The method of claim 28, wherein the substrate particles comprise precipitated silica.

30. The method of claim 29, further comprising adding the zinc solution to the precipitated silica during its manufacture, and precipitating the zinc material with excess acid or by adding sulfuric acid, hydrochloric acid, carbonic acid, or carbon dioxide.

31. The method of claim 30, further comprising precipitating the silica by adding sulfuric acid, hydrochloric acid, carbonic acid, or carbon dioxide, then mixing the solution and the precipitating silica before all of the silica is precipitated.

32. A method of making zinc-containing calcium carbonate particles, comprising:
- a) mixing (1) a slurry containing calcium hydroxide with (2) a zinc ammonia complex solution, and
- b) heating the mixed slurry and solution to remove substantially all ammonia, or until a pH of the mixed slurry and solution is between 7 and 9, thereby precipitating calcium carbonate particles further comprising ZnO, $Zn(OH)_2$ and/or $ZnCO_3$;
- c) carbonating the slurry containing the precipitated calcium carbonate particles to a pH of about 7 or less to neutralize any excess calcium hydroxide, and form calcium carbonate particles further containing $ZnCO_3$; and
- d) optionally, heating the precipitated particles to convert $ZnCO_3$ and/or $Zn(OH)_2$ to ZnO and form calcium carbonate particles further containing ZnO.

33. The method of claim 32, wherein the zinc ammonia complex solution comprises zinc ammine chloride or zinc ammine sulfate.

34. The method of claim 32, wherein said zinc ammonia complex solution contains zinc in a concentration of from 0.5% to about 16% by weight, ammonia in a concentration of from 0.5% to 20% by weight, and carbon dioxide in a concentration of from 0 to 20% by weight.

35. The method of claim 32, wherein said slurry contains calcium hydroxide in an amount of from 0.5 to about 20% by weight, measured as calcium oxide, and the ratio of zinc to calcium oxide is from about 0.1:1 to about 3:1.

36. The method of claim 32, wherein zinc-containing calcium carbonate particles contain ZnO, $Zn(OH)_2$ and/or $ZnCO_3$ in an amount of from 7 to 71 wt. % of Zn, measured as ZnO.

37. The method of claim 32, wherein the mixed slurry and zinc ammonia complex solution is heated at a temperature of about 80°C. to 150°C. and at pressure of 100 psi or less; and the method further comprises optionally washing, filtering and drying the precipitated zinc-containing calcium carbonate particles; optionally milling the precipitated zinc-containing calcium carbonate particles to a size distribution where 99.8% of the precipitated particles have a particle size under 325 mesh; and optionally calcining the milled precipitated particles at a temperature of about 150°C. to 600°C. to obtain calcium carbonate particles containing zinc oxide.

38. The composition of claim 1, wherein the coating consists essentially of zinc oxide.

39. The composition of claim 4, wherein the coating consists essentially of zinc oxide.

40. The composition of claim 8, wherein the coating consists essentially of zinc oxide.

41. The composition of claim 11, wherein the coating consists essentially of zinc oxide.

42. The method of claim 32, comprising heating the precipitated particles to convert $ZnCO_3$ and/or $Zn(OH)_2$ to $ZnO$ and form the calcium carbonate particles further containing $ZnO$.

* * * * *

UNITED STATES PATENT AND TRADEMARK OFFICE
CERTIFICATE OF CORRECTION

PATENT NO. : 7,635,729 B2 Page 1 of 1
APPLICATION NO. : 11/519949
DATED : December 22, 2009
INVENTOR(S) : Raymond Lee Nip It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this

Ninth Day of November, 2010

David J. Kappos
*Director of the United States Patent and Trademark Office*